(12) United States Patent
Grünsteidl et al.

(10) Patent No.: US 8,488,234 B2
(45) Date of Patent: Jul. 16, 2013

(54) ADIABATIC BEND TRANSITIONS FOR MULTIMODE FIBERS

(75) Inventors: Stefan Franz Grünsteidl, Munich (DE); João M. Sousa, Sobrado (PT); Martin O. Berendt, Arvore (PT); Rosa M. Muñiz, Porto (PT); Paulo T. Guerreiro, Senhora da Hora (PT)

(73) Assignee: Kongsberg Seatex AS, Trondheim (NO)

( * ) Notice: Subject to any disclaimer, the term of this patent is extended or adjusted under 35 U.S.C. 154(b) by 576 days.

(21) Appl. No.: 12/583,719

(22) Filed: Aug. 24, 2009

(65) Prior Publication Data

US 2011/0043898 A1  Feb. 24, 2011

(51) Int. Cl.
 *H04B 10/17* (2006.01)
 *G02B 6/24* (2006.01)
 *G02B 6/036* (2006.01)
(52) U.S. Cl.
 USPC .......................... 359/341.1; 385/29; 385/123
(58) Field of Classification Search
 USPC .............. 385/29, 123, 126, 127; 359/341.1
 See application file for complete search history.

(56) References Cited

U.S. PATENT DOCUMENTS

| | | | | |
|---|---|---|---|---|
| 5,818,630 | A  * | 10/1998 | Fermann et al. | 359/341.31 |
| 6,717,721 | B2 * | 4/2004 | Kent et al. | 359/341.5 |
| 7,266,259 | B1 * | 9/2007 | Sumetsky | 385/12 |
| 2005/0041702 | A1 * | 2/2005 | Fermann et al. | 372/25 |
| 2009/0059353 | A1 * | 3/2009 | Fini | 359/341.3 |
| 2009/0290841 | A1 * | 11/2009 | Borel et al. | 385/127 |
| 2010/0209044 | A1 * | 8/2010 | Sumetsky | 385/28 |

* cited by examiner

*Primary Examiner* — Eric Bolda
(74) *Attorney, Agent, or Firm* — San Diego IP Law Group, LLP

(57) ABSTRACT

Guided adiabatic bend transitions for multimode fibers are presented to preserve the power of guided light in the fundamental mode while guiding from one level of curvature to another for improved operation of mode filters and fiber amplifiers. A method is provided to find the guidance path. Implementations of these transducers include modal power back converters, and guidance paths into and out of higher order mode filtering devices which work on bending. A spiral structure is shown to incorporate adiabatic bends for a forward-pumped fiber amplifier.

17 Claims, 11 Drawing Sheets
(11 of 11 Drawing Sheet(s) Filed in Color)

ADIABATIC BEND TRANSITIONS FOR MULTIMODE FIBERS

BACKGROUND OF THE INVENTION

1. Field of Invention

This invention relates to fiber optic applications and more specifically, to an adiabatic bend transducer to support higher-order mode filtering and/or fundamental mode amplification for passive and active fiber assemblies.

2. Description of Related Art

Rare-earth doped fiber amplifiers offer important advantages compared to solid-state lasers in terms of power conversion, transverse mode stability, compactness and thermal management. See, e.g., A. Tünnerman et al., "The renaissance and bright future of fibre lasers," J. Phys. B 38, pp. 681-693 (2005), the disclosure of which is incorporated by reference herein in its entirety. A double cladding architecture and enlarged fiber cores allow the amplification of optical signals up to power levels appropriate for laser processing such as micro-machining and laser marking. See E. Snitzer et al., "Double-clad, offset core Nd fiber laser," Optical Fiber Sensors, OSA Technical Digest Series, vol. 2, postdeadline paper PD5 (1988), the disclosure of which is incorporated by reference herein in its entirety. In that way, even chirped pulse amplification to generate femtosecond and picosecond pulses can be achieved. See U.S. Pat. No. 5,499,134 to Galvanauskas et al., the disclosure of which is incorporated by reference herein in its entirety.

However, nonlinear effects (namely stimulated Brillouin scattering, stimulated Raman scattering, and/or self-phase modulation) limit the power scaling of fiber amplifiers to higher power levels. This is commonly overcome by further increasing the core diameter while decreasing the fiber core numerical aperture down to the technical limitations of 0.06, which results in a large mode area (LMA) fiber. In order to maintain an only diffraction limited output beam, single-mode operation of the fiber amplifier is highly desirable. This limits the effective fiber core area to a certain level. An increase beyond this level will give rise to higher order modes and thus result in a multimode LMA fiber that requires mode suppression techniques in order to preserve nearly fundamental mode propagation and thus the beam quality.

The most commonly used mode suppression technique is bending the fiber. Bending will induce a higher loss to the higher order modes than the fundamental mode, a characteristic which is typically referred to as "bend loss." Coils are required in any way, since the doped fiber will usually have several meters of length and packaging the amplifier to smaller sizes requires wrapping the fiber to some extent. The most direct approach is a helical coil achieved by wrapping the fiber around one or two rods of constant radius. See U.S. Pat. No. 6,496,301 to Koplow et al., the disclosure of which is incorporated by reference herein in its entirety. Fiber bends not only induce pure bend loss to the modes, but also inflict a transition loss at the transition from a straight fiber to a bend section and vice versa. See E. A. Marcatili et al., "Improved Relations Describing Directional Control in Electromagnetic Wave Guidance," Bell Sys. Tech. J. 48, pp. 2161-2188 (1969), the disclosure of which is incorporated by reference herein in its entirety. A bend transition in a multimode fiber will couple light out of the core as well as inflict coupling between guided core modes. In the case of the aforementioned patent to Koplow, light will be coupled to unwanted higher order modes at the beginning and the end of such a coil. See J. Baggett, "Bending losses in large mode area holey fibres," PhD Thesis, Chapter 2.2.1, University of Southampton (2004). LMA fibers of larger core size are even more sensitive to such changes in curvature, as stressed by recent research. See Sévigny et al., "Modal sensitivity analysis for singlemode operation in largemode area fiber," Proc. SPIE 6873, 68730A (2008), the disclosure of which is incorporated by reference herein in its entirety. In that way, a helical coil resembles only a compromise between bend induced mode coupling and higher order mode discrimination, and requires improvements.

The transition loss as such is highly underestimated by most people regarding LMA fibers, and has a huge impact on the performance when trying to reach smaller bend radii. This problem could be solved in a better way by adiabatic bend transitions, which change the level of curvature over a sufficient long length of fiber. In that way, transition losses from the fundamental mode will be minimized. See J. Baggett, PhD thesis, supra. The importance of adiabatic transitions in mode filters was further stressed in U.S. Patent Application Publication Nos. 2005/041702 to Fermann et al. and U.S. Patent Application Publication No. 2008/056656 to Dong et al., the disclosures of which are incorporated by reference herein in their entirety. Adiabaticity criterions were recently determined analytically for single mode fibers and computer simulations were performed on transition losses of LMA fibers. See J. Love et al., "Bend Loss, Tapering, and Cladding-Mode Coupling in Single-Mode Fibers," IEEE Photonic Tech L 19/16, pp. 1257-1259 (2007) and Hadley et al., "Bent-waveguide modeling of large-mode-area, double-clad fibers for high-power lasers", Proc. SPIE 6102, 61021S (2006), the disclosures of which are incorporated by reference herein in their entirety. Bend limiters exist to thwart tight bends in order to prevent power loss and physical damage of single mode or telecommunication fibers.

The shortcoming of these considerations lies in seeing the transition loss as a simple power loss while neglecting mode coupling, which is inadequate for devices where the mode distribution is important. Little research has been performed on bend-induced mode coupling and very little, if any, research has involved the investigation of bend induced mode coupling for adiabatic bends in LMA fibers. See Laperle, "Yb-Doped LMA Triple-Clad Fiber for Power Amplifiers," Proc. SPIE 6453, 645308 (2007), the disclosure of which is incorporated by reference herein in its entirety. This effect could further be used to couple light from higher order modes back into the fundamental mode. In that way, adiabatic mode scramblers can be realized to couple unwanted higher order core modes partially into the fundamental mode by series of varying adiabatic bends. Up to now, there are neither criteria for adiabatic bends in multimode fibers, nor precise embodiments.

Another design aspect for a fiber amplifier is the gain distribution and gain competition in the pumped fiber amplifier. The pump light and hence the amplification is stronger on the pumped side of the fiber. Imperfection in real fiber amplifiers, e.g., due to fiber splicing, provokes the generation of higher order modes, thereby decreasing the mode quality at an early stage. The aspect of mode competition in fiber amplifiers is well known. See J. Sousa et al., "Multimode Er-doped fiber for single-transverse-mode amplification," Appl. Phys. Lett. 74/11, pp. 1528-1531 (1999), the disclosure of which is incorporated by reference herein in its entirety. Fundamental mode excitation further reduces higher order modes caused by amplified spontaneous emission (ASE). See U.S. Pat. No. 5,187,759 to DiGiovanni, the disclosure of which is incorporated by reference herein in its entirety. Thus, higher order modes should be minimized in the shortest length of fiber possible for forward-pumped fiber amplifiers, since they will decrease the gain for the fundamental mode, and they were amplified themselves. This fact is missing in prior analyses, and should especially be implemented into forward pumped fiber amplifier designs for improved operation.

The last design consideration involves the strong reduction of the mode area in LMA fibers by bending. See J. Fini, "Bend-compensated design of large-mode-area fibers", Opt. Lett. 31, pp. 1963-1965 (2006), the disclosure of which is incorporated by reference herein in its entirety. For a forward pumped fiber amplifier, the signal power density increases towards the end of the fiber, which makes further increases by a reduced mode area critical. This implicates a reduction of the bend of the mode filter towards the end of the amplifier to avoid reaching the non-linear effect region. On top of that, a tight bending at the beginning induces a significant loss to the fundamental mode as well, which makes a reduction of the bend radius inevitable. A constantly alternating bend structure provides the best solution for this, which results in the shape of a spiral towards the amplifier output. A spiral would additionally provide the smoothest bend transition and such meet the aforementioned adiabaticity criterion.

So far, only a few attempts have been attempted to reduce the mode coupling at the beginning and the end of a coiled fiber amplifier. Even fewer consider a non-symmetrical bend design, e.g., U.S. Patent Application Publication No. 2009/059,352 to Fini, the disclosure of which is incorporated by reference herein in its entirety, and none of the attempts so far takes into account the non-uniform distribution of the gain along a forward pumped amplifier in combination with adiabatic bend transitions. It is believed that no other preliminary work has been done to design an optimized adiabatic fiber bend transducer.

SUMMARY OF THE INVENTION

The present invention overcomes these and other deficiencies of the prior art by providing guided adiabatic bend transitions for multimode fibers to support higher-order mode filtering and/or fundamental mode amplification.

In an embodiment of the invention, a multi-mode optical fiber comprises: an adiabatic bend section, said bend section comprising a length of multi-mode fiber being bent according to a bend radius that varies according to a nonlinear transition function over said length; and an output section adjoining said bend section, said output section having no observable transverse modes above a fundamental mode when light propagates through said adiabatic bend section. The transition function is preferably a quadratic polynomial function, which can also be expressed with a combination of mathematical sine and cosine functions. A twisted section adjoining said adiabatic bend section may be further included. The multi-mode adiabatic bend section can be bent in at least two geometrical planes such as a spiral. The length of multi-mode fiber may be doped with rare-earth ions, comprise a double-cladding structure, and/or have a V-number greater than 2.4. Furthermore, a plurality of adiabatic bend sections may be implemented in the fiber.

In another embodiment of the invention, an optical system comprises: a light source, and a multi-mode optical fiber, said multi-mode optical fiber comprising: an adiabatic bend section, said bend section comprising a length of multi-mode fiber being bent according to a bend radius that varies according to a nonlinear transition function over said length; and an output section adjoining said bend section, said output section having no observable transverse modes above a fundamental mode when light propagates through said adiabatic bend section. The light source may comprise a pulsed light source or a continuous wave light source. A laser pump may be further included. The system may further comprise a guide for imparting said adiabatic bend section within said multi-mode optical fiber.

In yet another embodiment of the invention, a method of finding an optimum adiabatic guided path in a multi-mode optical fiber comprises the steps of: sampling different fiber paths with a computer simulation program using a beam propagation method, and monitoring a modal interference at an output of the sampled different fiber paths.

In another embodiment of the invention, an optical fiber comprises: a bend section, and an adiabatic transducer applied to the entrance and/or exit of said bend section, said adiabatic transducer minimizing modal coupling out of a fundamental mode. The bend section may include a coil such as a helical coil.

The invention increases the efficiency of high-power fiber amplifiers and improves the output beam quality in terms of the M2 factor, which is the industrial measure of the mode quality.

The foregoing, and other features and advantages of the invention, will be apparent from the following, more particular description of the preferred embodiments of the invention, the accompanying drawings, and the claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

For a more complete understanding of the present invention, the features and advantages thereof, reference is now made to the ensuing descriptions taken in connection with the accompanying drawings briefly described as follows.

DETAILED DESCRIPTION OF EMBODIMENTS

Figure 1:
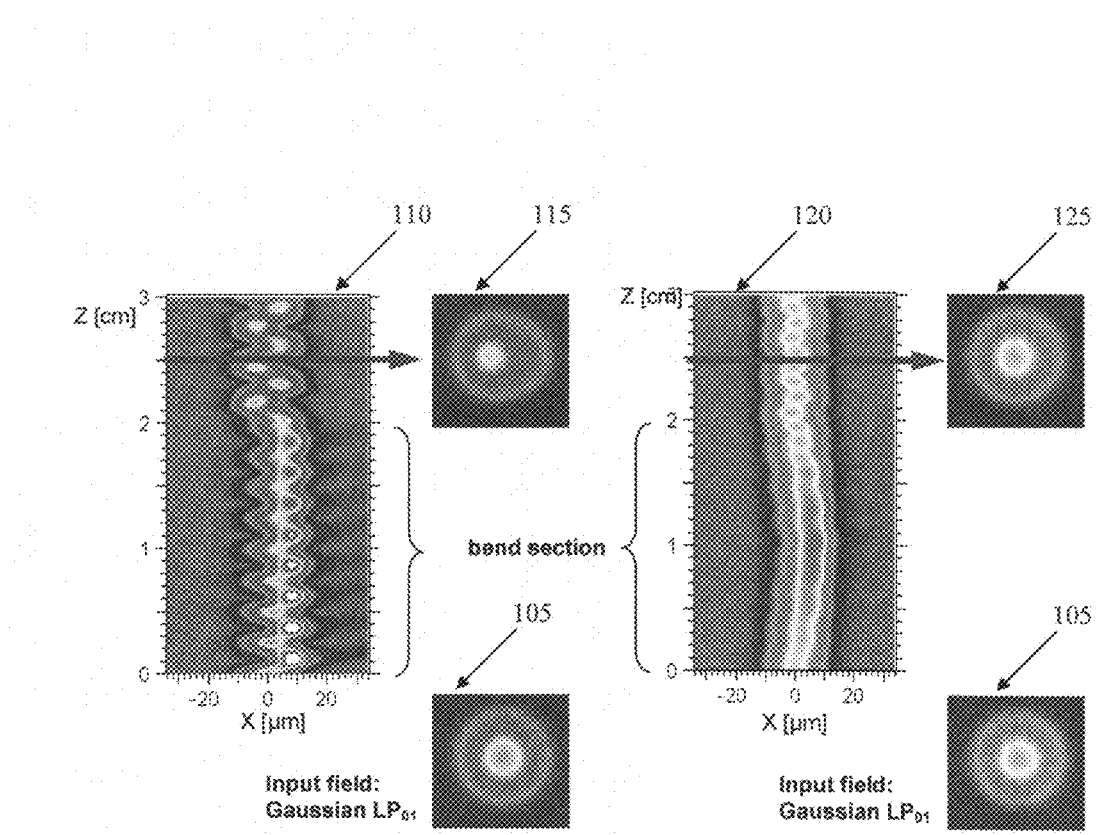
FIG. 1 illustrates simulated bend sections for two fibers.

Further features and advantages of the invention, as well as the structure and operation of various embodiments of the invention, are described in detail below with reference to the accompanying FIGS. 1-12, wherein like reference numerals refer to like elements. The present invention implements guided adiabatic fiber bend transitions to support higher-order mode filtering and/or fundamental mode amplification for passive and active fiber assemblies such as, but not limited to step-index LMA fibers and photonic crystal fibers (also called holey fibers, hole-assisted fibers, microstructure fibers, or microstructured fibers). The fibers themselves may be passive or doped, normal or polarization maintaining, and incorporated into fiber assemblies or amplifiers, which are run in continuous wave or pulsed operation. The invention can be applied to virtually any fiber that guides multiple modes, for which the modal distribution changes by bending the fiber.

In an embodiment of the invention, an adiabatic bend transducer is implemented to guide a fiber from one level of curvature, e.g., a straight piece of fiber, to another level of curvature, which could be a strong bend. The optical paths for these adiabatic bends are well-confined fixed by a form of guidance such as, but not limited to grooves or fiber holders, which overcomes the drawback of a simple bend limiter. These paths were found using a beam propagation method (BPM), the implementation of which is apparent to one of ordinary skill in the art as it is a common computer simulation method for simulating the propagation of light in waveguide devices and circuits. The simulations were performed with an optical wavelength of 1.06 μm, a core diameter of 25 μm, and a core NA of 0.06. However, not every bend transition is sufficient enough to eliminate coupling to higher order modes.

FIG. 1 illustrates simulated bend sections for two fibers. In this figure as well as FIGS. 2, 3, and 6, the large images with axis descriptions show an X-Z contour plot of the light intensity with Z being the direction of propagation and X being one coordinate axis orthogonal to it. Here, the coordinates X-Y-Z span a standard Cartesian coordinate system with the origin of the X-Y-axes at the center of the fiber core, and the origin of Z being the starting point of propagation. The small images show X-Y-cuts at the indicated locations along the Z-axis. The color scheme is a standard rainbow scheme with a minimum indicated with purple/blue and a maximum with red. The color white indicates values higher than the chosen color scale. Referring specifically again to FIG. 1, image 110 pertains to a simulated fiber bend section with a uniform, i.e., constant, bend diameter of 60 mm over a length of 2 cm. Image 120 pertains to a simulated fiber bend section that has a gradual linear changing bend with a maximum bend diameter of 60 mm at 1 cm along the Z-axis. Each simulated fiber has a length of 3 cm and is subjected to an input optical field 105 representing a perfect fundamental mode designated as $LP_{01}$ (based on a Gaussian beam distribution), which travels from a straight piece of fiber into a bend and back to an unbent section. Both images 110 and 120 show the presence of higher order modes at the respective outputs 115 and 125 by wave patterns caused by modal interference. However, the modal interference is greatly reduced for the gradual transition of the simulated fiber shown in image 120.

Figure 2:
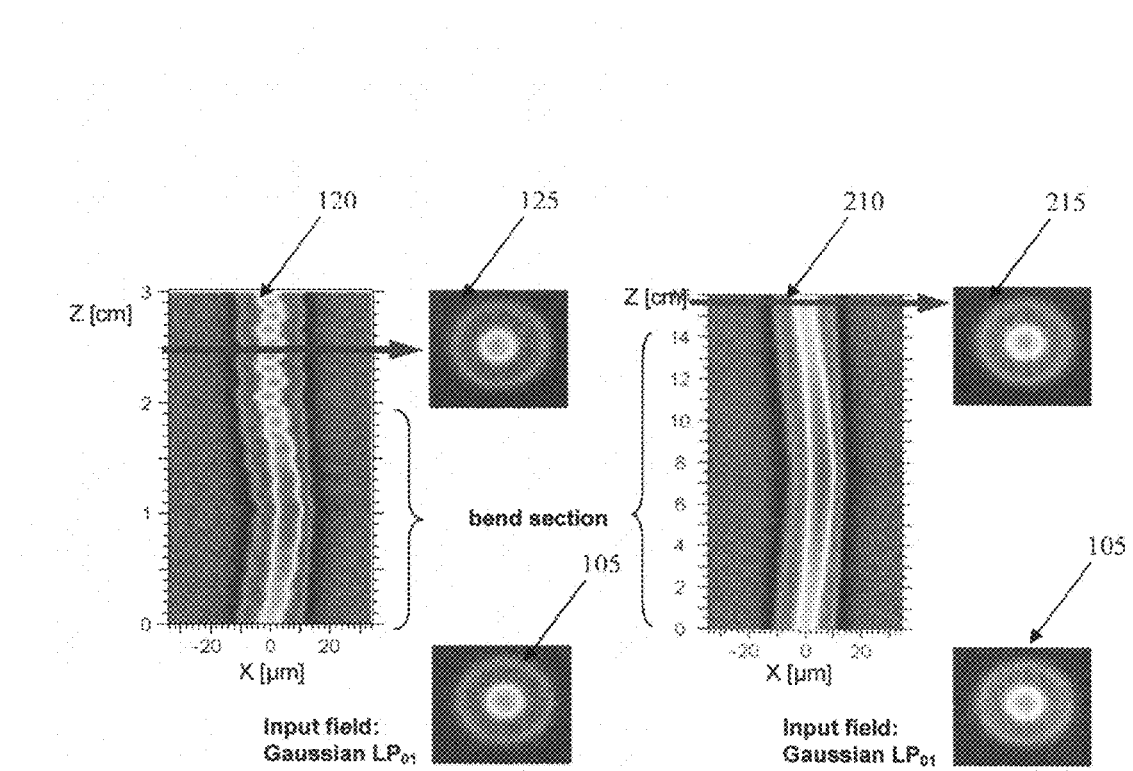
FIG. 2 illustrates simulated bend sections for two fibers having a linearly changing bend section with a maximum bend diameter of 60 mm.

There are two techniques for finding an adiabatic path. In one technique, the length of the gradual transition is stretched, i.e., increased, until the output field propagation resembles that of the input field. FIG. 2 illustrates simulated bend sections for two fibers having a linearly changing bend section with a maximum bend diameter of 60 mm. These bend sections are shown in images 120 and 210, the former being the same 2 cm bend section as shown in FIG. 1. However, the fiber simulated in image 210 has a transition length stretched by a factor of seven (7), i.e., the gradual bend from 0 cm to 2 cm for the fiber in image 120 has been increased from 2 cm to 14 cm as shown in image 210. The output 215 shown has been taken at approximately 15.5 cm along the z-axis.

There are two drawbacks of implementing the stretching technique noted above. First, there's a longer piece of fiber required, which might be disadvantageous for some applications such as input coils of fiber amplifiers. Second, the longer transition will not only reduce coupling out of the $LP_{01}$ mode, but as well reduce coupling into the fundamental mode from higher order modes. In that way, the performance of filter devices and amplifiers are reduced if higher order modes are present.

Figure 3:
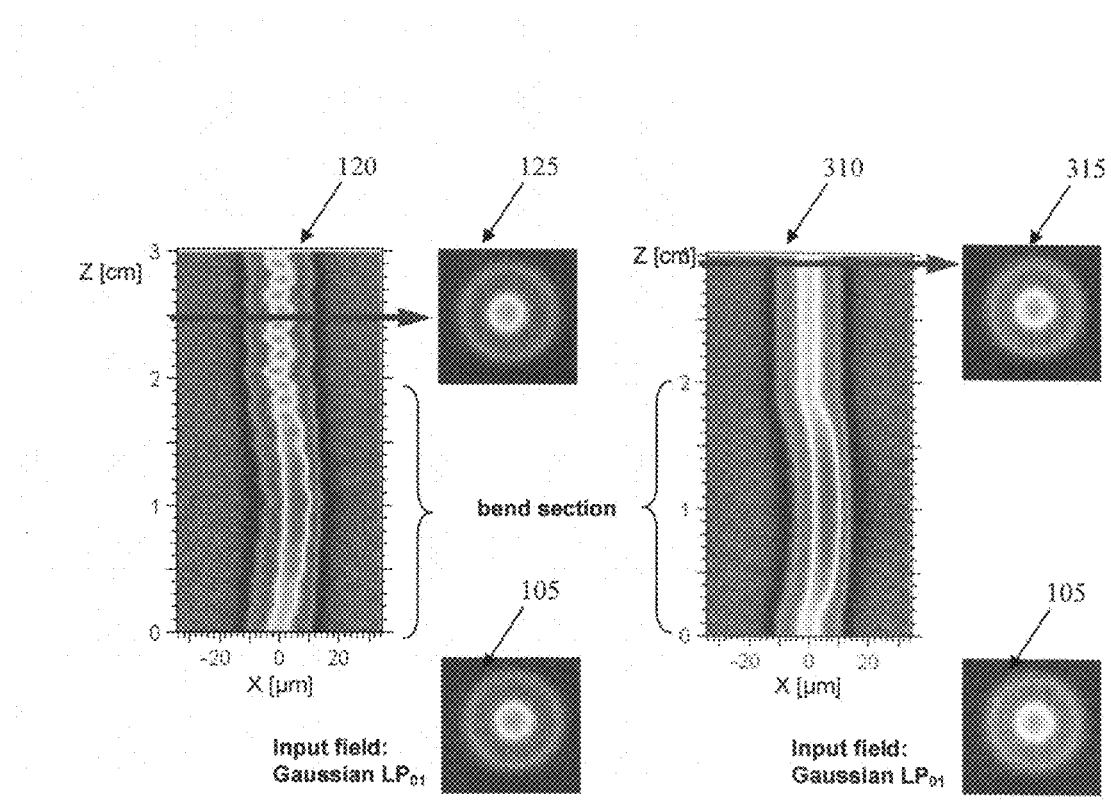
FIG. 3 illustrates an optimized guidance path of a simulated fiber according to an embodiment of the invention.

These drawbacks are overcome by a second technique that finds an optimized guidance for the same length of fiber. FIG. 3 illustrates an optimized guidance path of a simulated fiber according to an embodiment of the invention. Image 310 pertains to a simulated fiber having a gradual changing bend section with a maximum bend diameter of 60 mm and a total length of the bend section of 2 cm like the fiber simulated in image 120. Although the fiber bend in image 120 undergoes a linear change, the bend reflected in image 310 changes according to a quadratic function to meet adiabaticity conditions such that there's no higher order mode content observable in the output field. The output 315 shown has been taken at approximately 3 cm along the z-axis. The explicit changes of curvature along the fiber were found by sampling simulated paths and experimental implementation of these paths. Mathematical functions for possible bend paths were factorized and sampled to reduce the content of higher order mode coupling. The minimization of higher order modes is well visible by the absence of interference patterns caused by mode beating and can further be verified by Fourier analysis or other mathematical decomposition methods, the implementation of which is readily apparent to one of ordinary skill in the art. The results show that an arbitrary change of the fiber curvature along the propagation direction, even if it is a linear change, excites higher order modes, while an optimized change of curvature does not. This proves the necessity of a confined path of the adiabatic transducer to ensure adiabaticity and prevent unwanted coupling.

Figure 4:
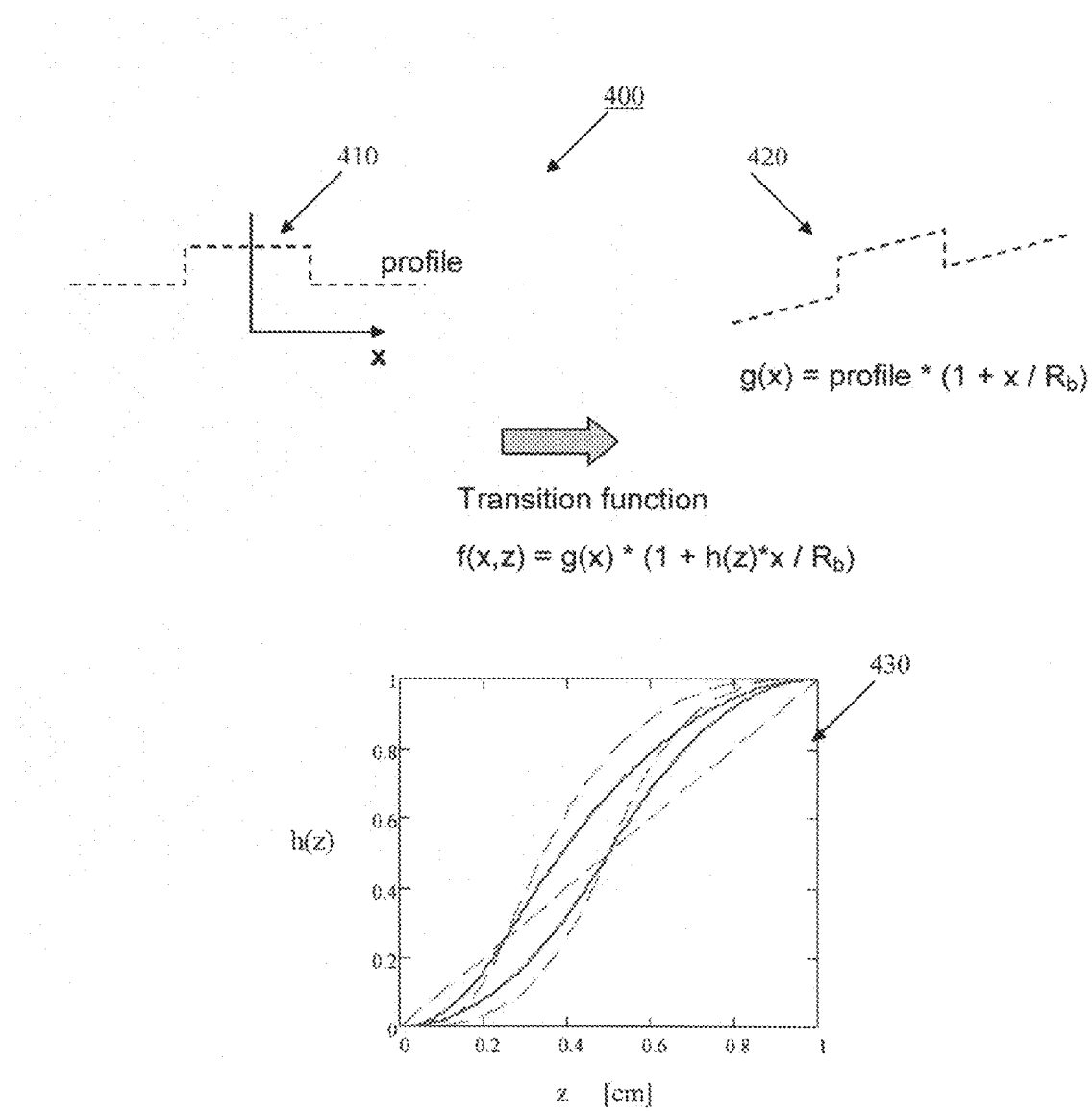
FIG. 4 illustrates a technique for finding an optimized adiabatic path over the shortest length of fiber possible according to an embodiment of the invention.

FIG. 4 illustrates a technique 400 for finding an optimized adiabatic path over the shortest length of fiber possible according to an embodiment of the invention. The refractive index profile for a straight step-index LMA fiber (having a wavelength of 1.06 μm, a core diameter of 25 μm, a core NA of 0.06, and a transition length of 1 cm) is depicted on the top left corner as profile 410. Fiber bends with the radius $R_b$ will tilt and such distort the refractive index profile 410 by the function $(1+x/R_b)$ as shown in profile 420, which is a result commonly accepted in the literature. The goal of BPM computer simulations lies now in finding a transition function that gives an adiabatic transition for the fundamental mode along the propagation direction z in the shortest distance by varying the parameters of a polynomial function h(z), as shown in the graph 430 at the bottom of FIG. 4. The green solid line curves represent polynomial functions that reduce coupling to higher order modes below an observable level. As such they are well suited for adiabatic transition functions, while the red dashed curves fail in doing that. The length of fiber was reduced after that, and the polynomial variation was started again until a minimal length of fiber with the corresponding adiabatic transition functions was found. This routine is not limited to polynomial functions. Other parameterized mathematical functions, such as parameterized trigonometric functions, e.g., sine and cosine functions, can be used with similar success, the identification of which is apparent to one of ordinary skill in the art. The resulting transitions were additionally manufactured in a row of several undergone transitions, namely a series of S-bends, in order to amplify even small coupling effects for visualization. This gives a practical validation of the simulation paths.

Figure 5:
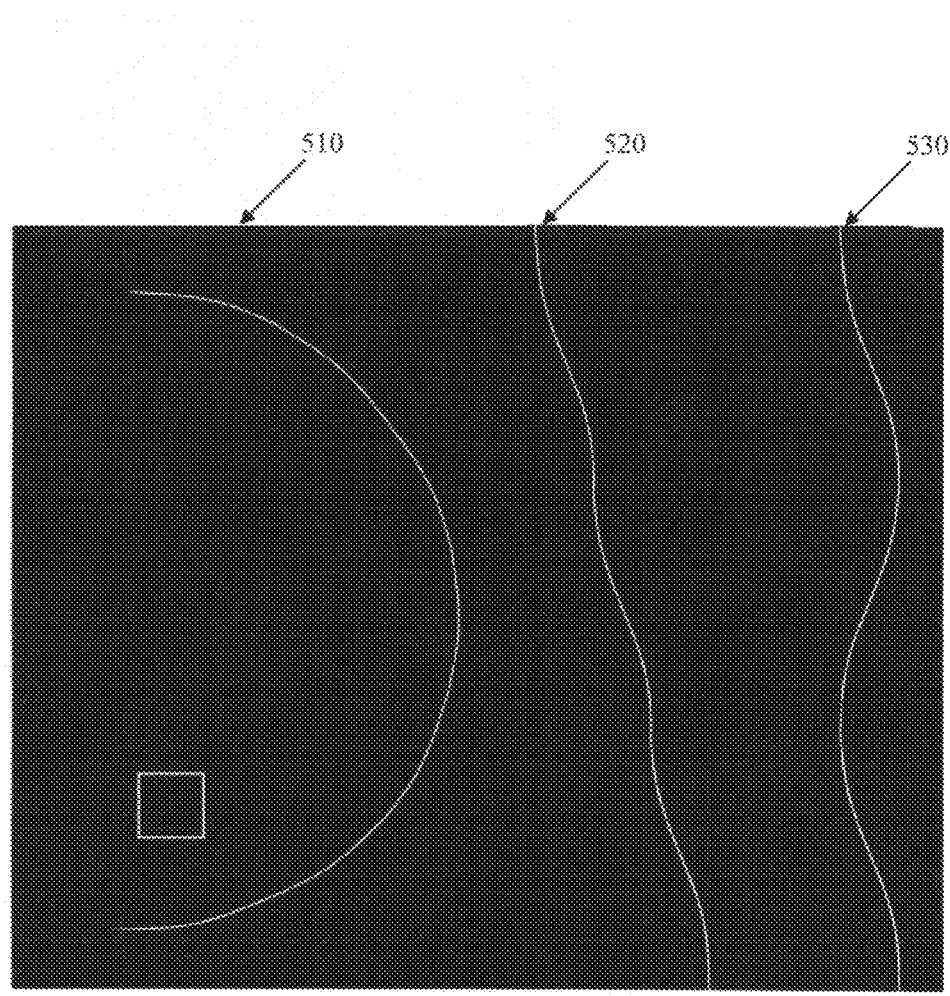
FIG. 5 illustrates three different fiber bend paths comprising several adiabatic transitions of 1 cm each according to an embodiment of the invention.

The adiabatic transducers can be applied in different ways. In one example, a series of adiabatic bend transitions is implemented, which conserves the original modal power in the fundamental mode, but induces mode coupling to the higher order modes. In these series of bends, straight parts and bend parts alternate one after another. FIG. 5 illustrates three different possible fiber bend paths comprising adiabatic transitions of 1 cm each according to an embodiment of the invention. The three fiber bend paths 510, 520, and 530 are indicated with white on a black background and were generated from out of an adiabatic transition function 430 with a programmable computer aided design (CAD) software tool. The square on the left is for scaling purposes and has a side length of 1 cm. The path 510 comprises 14 adiabatic transitions. Paths 520 and 530 each have 12 adiabatic transitions i.e., 6 so-called S-bends. The depicted paths show possible devices for higher order mode back conversion in one plane if the paths are filled with LMA step-index fibers with a core diameter of 25 μm and a cladding diameter of 250 μm. Other assemblies are possible, including bend paths in three dimensions. Devices fabricated with these guides work as a mode filter for active or passive LMA fibers with a small amplification effect even for passive fibers, since a part of the higher order modes will be coupled back into the fundamental mode.

Figure 6:
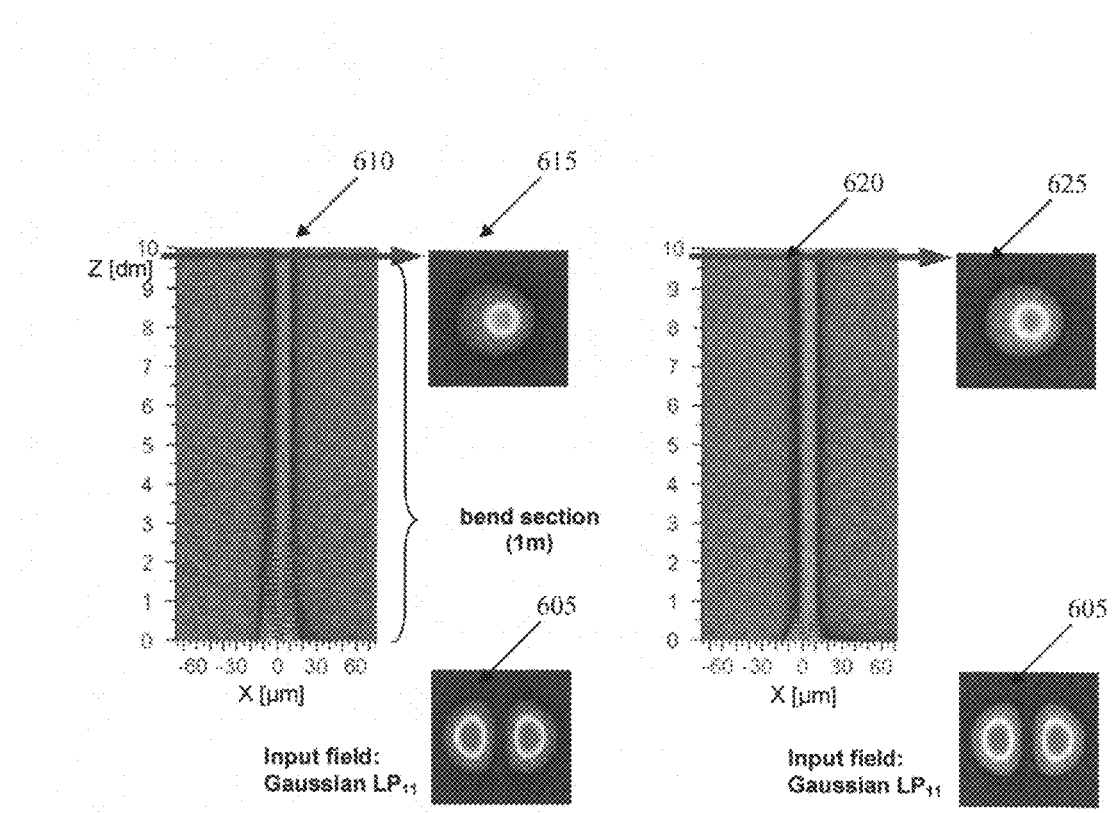
FIG. 6 illustrates simulated fiber bend sections for mode coupling from higher order modes to the fundamental mode according to an embodiment of the invention.

FIG. 6 illustrates the coupling of higher order modes back into the fundamental mode according to an embodiment of the invention by BMP simulation results. The images 610 and 620 show the propagation of the first higher order even mode $LP_{11}$ 605 into a simulated abrupt fiber bend with a length of 1 m by X-Z intensity plots. Image 610 pertains to a fiber having a bend diameter of 80 mm. Image 620 pertains to a fiber having a bend diameter of 70 mm (both fibers with a core diameter of 25 μm, a core NA of 0.06, and at a wavelength of 1.06 μm). A comparison of the two images shows that a smaller bend radius 620 attenuates modes in a stronger way, such as modal interference patterns disappear after a shorter propagation distance compared to image 610, but it also shows an increased mode coupling into the fundamental mode. The output intensity cross-section X-Y plot in picture 625 shows an increased output power by 22% in comparison to picture 615 with both mode profiles consisting solely of the fundamental mode $LP_{01}$ in the bent state. This demonstrates the increased power coupling possibility for tighter coils in terms of modal back conversions, which are only practical with adiabatic transitions.

Another application of adiabatic bend transitions is the pure guidance of the fiber from one level of curvature to another by minimizing modal power loss of the fundamental mode. Adiabatic transducers become of profound interest for fiber filtering devices based on the bend effect. They could be used to connect filtering bends of different, but constant curvature, such as helical coil filters disclosed in U.S. Pat. No. 6,496,301 to Koplow et al. Regarding Koplow's patent, adiabatic transducers should be applied to the entrance and the exit of these helical coils in order to minimize modal coupling out of the fundamental mode before and after filtering. They significantly enhance the efficiency and the functionality of these devices.

For the assembly of a forward pumped fiber amplifier, an adiabatic bend transition should be used right at the entrance of the actively doped fiber to reach fundamental mode propagation in the shortest length of fiber possible. Observing images 610 and 620, one of ordinary skill in the art readily appreciates that fundamental mode propagation will be reached in a shorter length of fiber for tighter bends. Tighter bends itself are only effective without a massive transition loss to the fundamental mode, which is only possible by an adiabatically guided transition.

Figure 7:
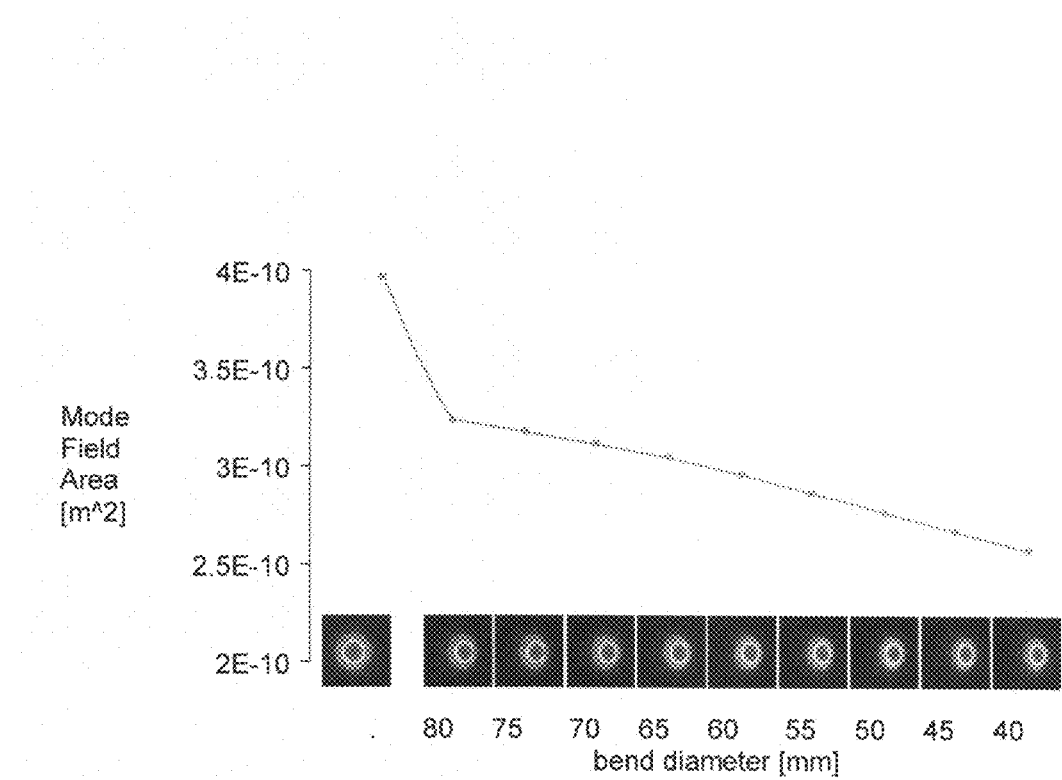
FIG. 7 shows the change of the mode field area (orange curve) of the fundamental mode in a standard LMA fiber with a core diameter of 25 μm and a cladding diameter of 250 μm according to an embodiment of the invention.

The exit adiabatic transition of the amplifier, on the other hand, should be as long as possible, since the light intensity in the core will be much higher as in the entrance part. Another reason for this is the decreased mode size and therefore the higher power density for tighter bends. FIG. 7 shows the change of the mode field area (orange curve) of the fundamental mode in a standard LMA fiber with a core diameter of 25 μm and a cladding diameter of 250 μm according to an embodiment of the invention. The bend diameters are indicated on the graph which range from 40-80 mm. The bend diameter of infinity represents a straight piece of fiber. The small images visualize the mode area and show the light intensity distributions, which were calculated with the computer simulation programs using the finite element method (FEM) to solve Helmholtz's equation. The area was defined by intensity levels above $1/e^2=13.53\%$ of the maximum intensity, which is the common definition of the mode area.

The shape of a flat spiral for the exit adiabatic transition is the best resemblance of this principle. For practical reasons (as of packaging, thermal behavior or material properties) a conical shape might be preferred to a flat plane. The considerations hold true for forward-pumped amplifiers using doped multimode fibers with high bend discrimination for higher order modes compared to the fundamental mode, namely step-index LMA fibers, photonic crystal or holey fibers, fibers with or without polarization maintenance and others which meet the condition of higher order mode bend discrimination.

Figure 8:
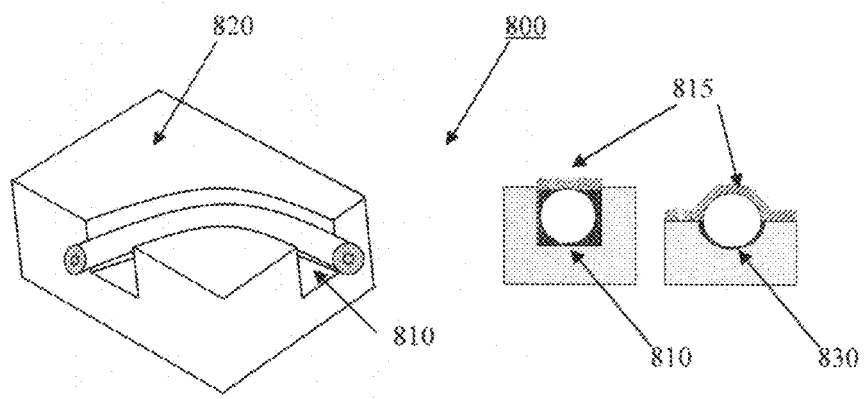
FIG. 8 shows a groove system that can be used to implement adiabatic bends according to an embodiment of the invention.

FIG. 8 shows a groove system 800 that can be used to implement adiabatic bends according to an embodiment of the invention. Grooves 810 within a solid object 820 hold the fiber in place and guarantee an unchanged guidance path. The grooves 810 could be engraved in a flat plate, or on the inside or outside wall of a conical object. Another possibility is to insert the fiber into a wound hollow pipe. Alternatively, the fiber could be fixed in a soft material or glue 815, which can be solidified thereafter. Modal back converters can be realized with series of such transducers. The grooves 810 can be implemented as square grooves or round grooves 830 for better contact. The fixing material 815 can be optically transparent to the fiber propagated radiation and have thermally conductive properties. The solid object 820, holding the fiber in place may also serve as a heat dissipater for proper fiber heat extraction. This is particularly relevant in high power fiber lasers and amplifiers. The solid object 820 may also incorporate any other means of heat dissipation such as, but not limited water cooling, forced air flow or any other method, the identification and implementation of which is readily apparent to one of ordinary skill in the art.

Figure 9:
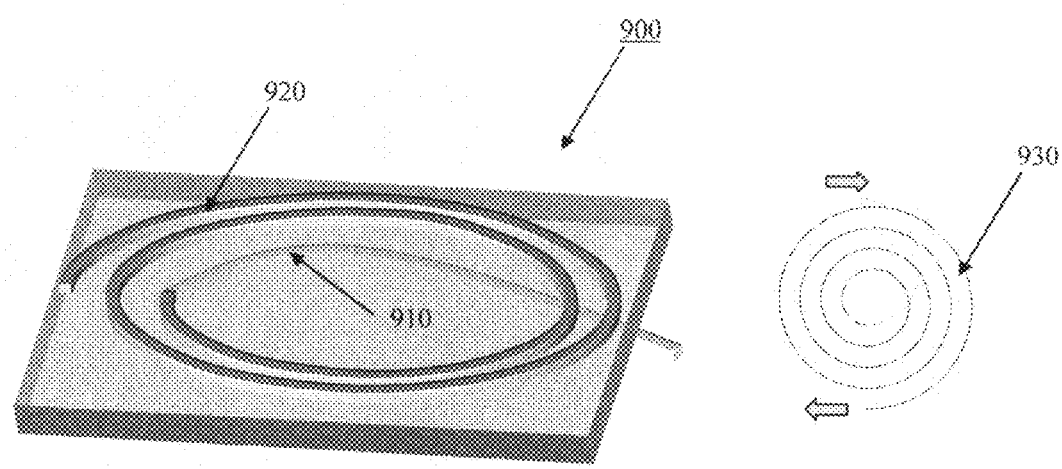
FIG. 9 illustrates a forward pumped multimode amplifier according to an embodiment of the invention.

FIG. 9 illustrates a forward pumped multimode amplifier 900 according to an embodiment of the invention. The amplifier 900 comprises a relatively short adiabatic bend 910 on the backside of a flat plate, and a spiral winding 920 on the top. The principle with the direction of light propagation is further depicted in picture 930.

Figure 10:
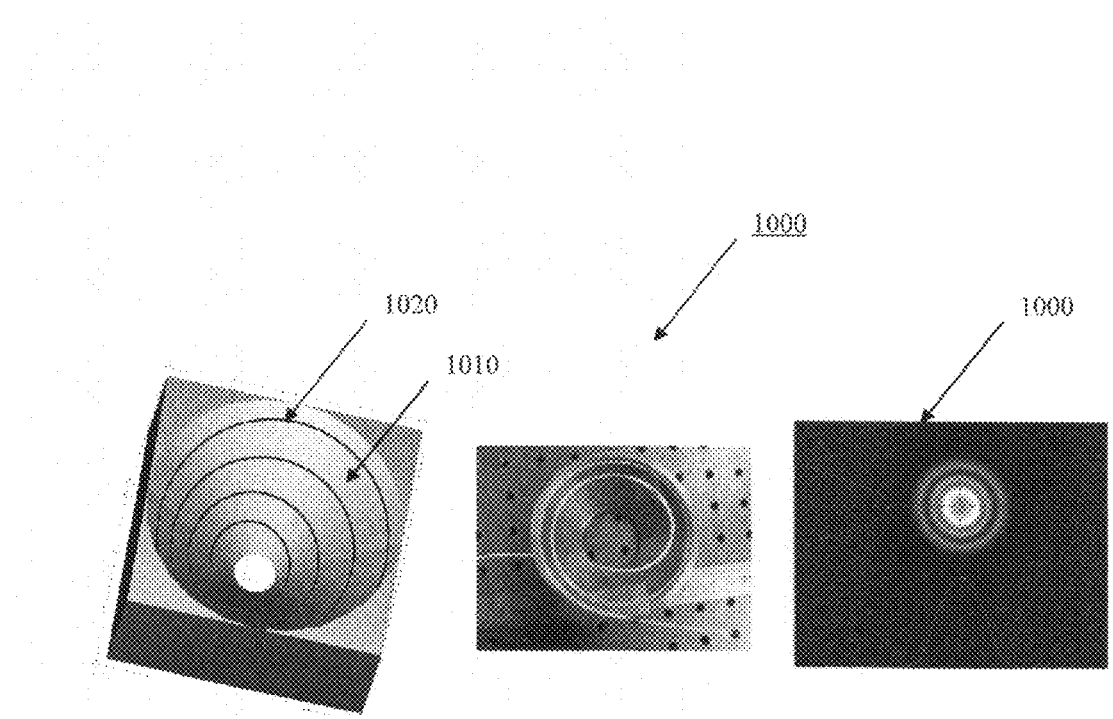
FIG. 10 illustrates a spiral winding structure according to an embodiment of the invention.

FIG. 10 illustrates a spiral winding structure 1000 according to an embodiment of the invention. Particularly, the spiral winding structure 1000 comprises a cone 1010 with grooves 1020 on the inside. Picture 1030 is a schematic of the actual implemented amplifier structure 1000. Picture 1040 on the right shows the near field output beam intensity of this structure, which is almost single mode. This was demonstrated experimentally with a forward-pumped Ytterbium (Yb) fiber amplifier with an output of about 1 W in CW regime.

Figure 11:
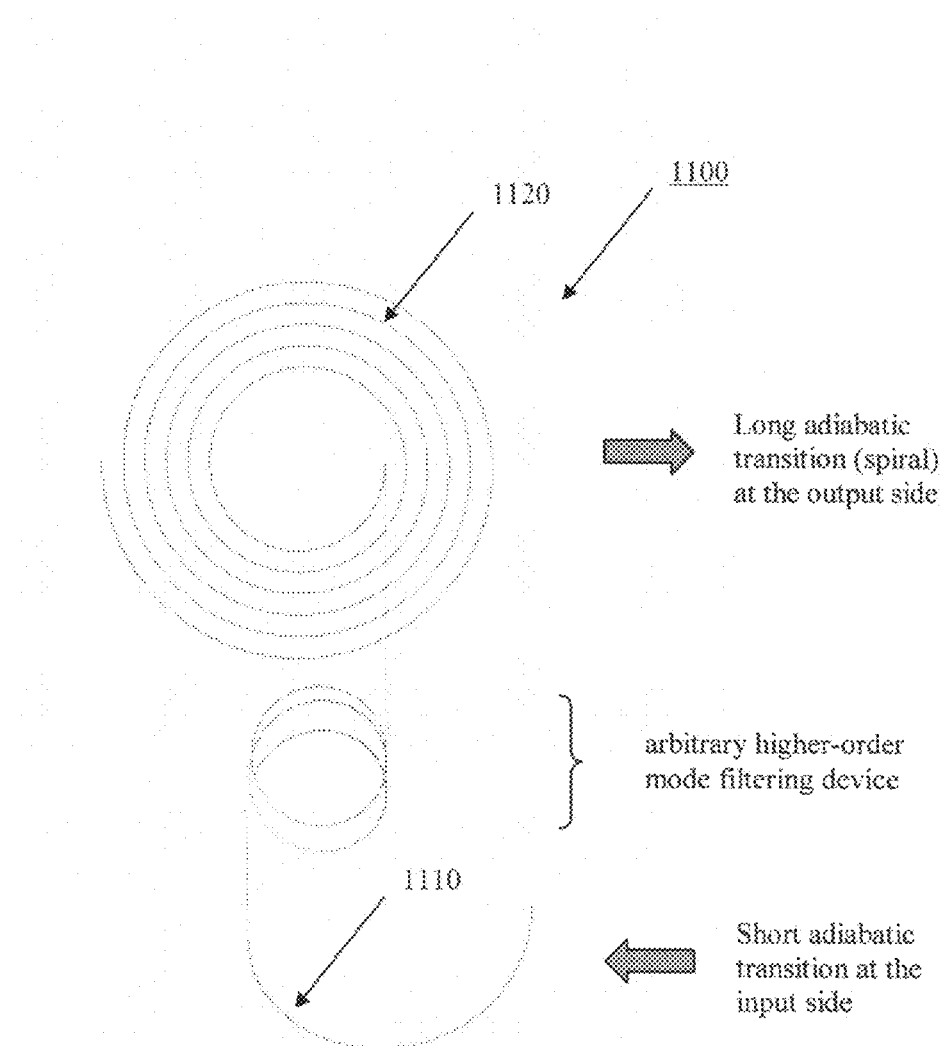
FIG. 11 illustrates a forward-pumped fiber amplifier structure according to an embodiment of the invention.

FIG. 11 shows a schematic of a forward-pumped fiber amplifier structure 1100 according to an embodiment of the invention. The fiber amplifier structure 1100 comprises adiabatic guided transitions 1110 and 1120 at the input and output side. While the transition 1110 at the input side is relatively short, the transition 1120 at the output side should be relatively long, e.g., a spiral.

Figure 12:
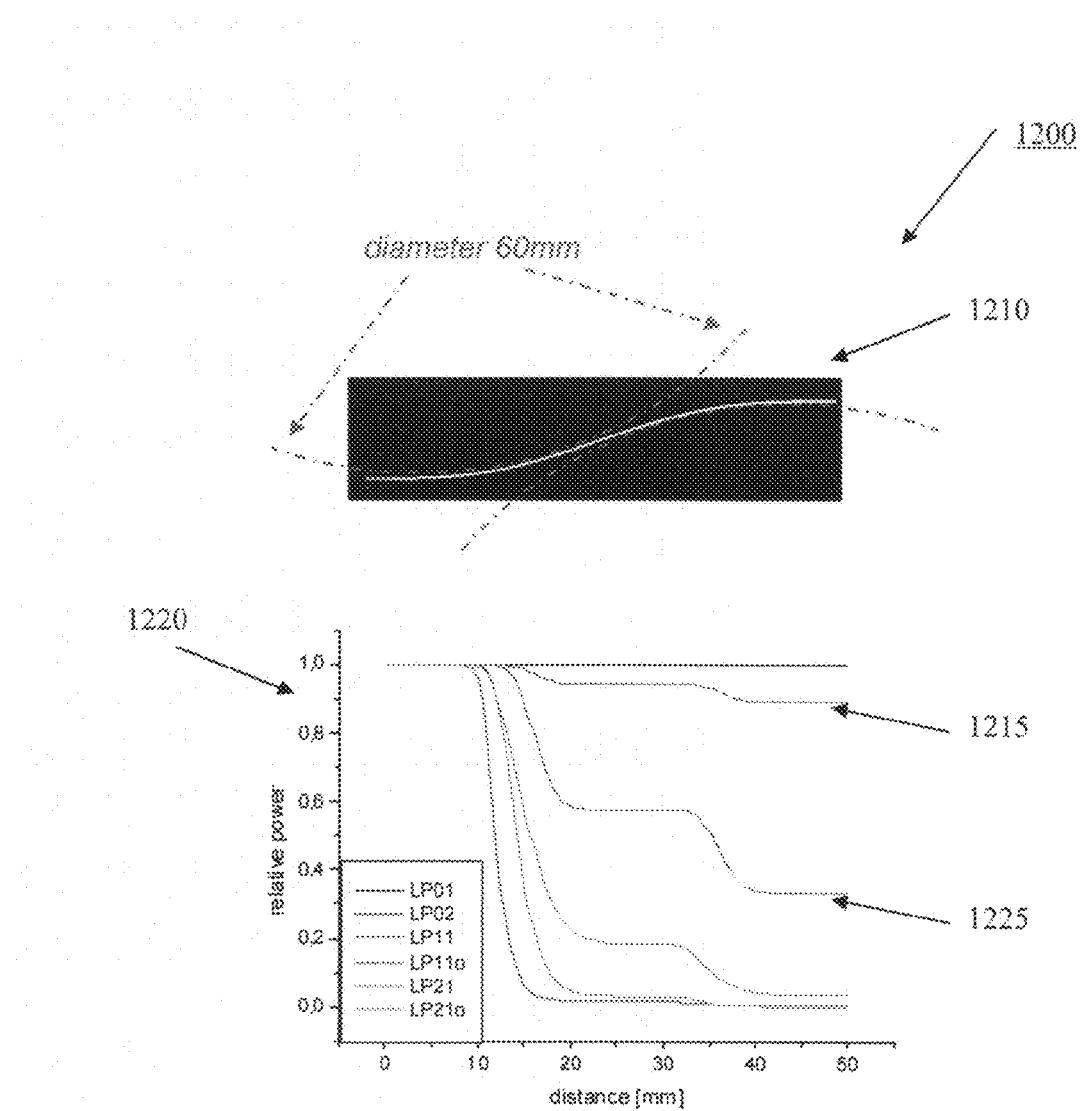
FIG. 12 illustrates a fiber bend path comprising four adiabatic transitions of 1 cm and the corresponding power loss graph according to an embodiment of the invention.

FIG. 12 illustrates a fiber bend path 1200 according to an exemplary embodiment of the invention. The bend section 1210 is similar to parts of the fiber bend paths 520 and 530 and comprises four (4) adiabatic transitions of 1 cm each enclosing two (2) bend sections with the indicated diameter of 60 mm. BPM simulations of this specific structure (simulating an LMA step-index fiber with a core diameter of 25 µm, a core NA of 0.06, and a wavelength of 1.06 µm) show a different power loss for the single modes, as indicated in graph 1220. As expected, the higher order modes loose a significant amount of power when propagated through the assembly, while the fundamental mode $LP_{01}$ only encounters a marginal loss. But the calculation shows as well that the loss for the even modes, e.g., $LP_{01}$ 1215, can be significantly different compared to the corresponding odd mode 1225. This finding, which coincides with the literature, shows that there are improvements possible by not keeping the bend in one plane. As such, consecutive bends perpendicular to each other can cancel this effect. Another way is to twist the fiber before it is fixed into the bend. Twisting can rotate the modes around the center and hence, transform an even mode into an odd mode and vice versa. The practical method of twisting can improve the behavior of every assembly mentioned in this patent, specifically when using polarization maintaining fibers, and should be exploited for maximized device performance.

The invention has been described herein using specific embodiments for the purposes of illustration only. It will be readily apparent to one of ordinary skill in the art, however, that the principles of the invention can be embodied in other ways. Therefore, the invention should not be regarded as being limited in scope to the specific embodiments disclosed herein, but instead as being fully commensurate in scope with the following claims.

We claim:

1. A multi-mode optical fiber comprising:
   an adiabatic bend section, said bend section comprising a length of multi-mode fiber being bent according to a bend radius that varies according to a nonlinear transition function over said length, wherein the nonlinear transition function is a quadratic function or a trigonometric function, wherein the nonlinear transition function is based on a gain of an amplifier, wherein the gain is non-uniformly distributed; and
   an output section adjoining said bend section, said output section having no observable transverse modes above a fundamental mode when light propagates through said adiabatic bend section.

2. The multi-mode optical fiber of claim 1, wherein the quadratic function is a second order polynomial function and the trigonometric function comprises a sine function or cosine function.

3. The multi-mode optical fiber of claim 1, further comprises a twisted section inside or adjoining said adiabatic bend section.

4. The multi-mode optical fiber of claim 1, said adiabatic bend section being bent in at least two geometrical planes.

5. The multi-mode optical fiber of claim 4, said adiabatic bend section having a shape resembling a spiral.

6. The multi-mode optical fiber of claim 1, said length of multi-mode fiber is doped with rare-earth ions.

7. The multi-mode optical fiber of claim 1, said length of multi-mode fiber comprises a double-cladding structure.

8. The multi-mode optical fiber of claim 1, said length of multi-mode fiber having a V-number greater than 2.4.

9. The multi-mode optical fiber of claim 1, further comprising one or more additional adiabatic bend sections.

10. An optical system comprising:
    a light source, and
    a multi-mode optical fiber, said multi-mode optical fiber comprises:
       an adiabatic bend section, said bend section comprising a length of multi-mode fiber being bent according to a bend radius that varies according to a nonlinear transition function over said length, wherein the nonlinear transition function is a quadratic function or a trigonometric function; and
       an output section adjoining said bend section, said output section having no observable transverse modes above a fundamental mode when light propagates through said adiabatic bend section.

11. The optical system of claim 10, said light source comprises a pulsed light source.

12. The optical system of claim 10, said light source comprises a continuous wave light source.

13. The optical system of claim 10, further comprising a laser pump.

14. The optical system of claim 10, further comprising a groove for inserting said adiabatic bend section within.

15. An optical fiber comprising:
    a bend section, and
    an adiabatic transducer applied to the entrance and/or exit of said bend section, said adiabatic transducer minimizing modal coupling out of a fundamental mode by having a bend radius that varies according to a nonlinear transition function that is a quadratic function or a trigonometric function.

16. The optical fiber of claim 15, said bend section comprising a coil.

17. The optical fiber of claim 16, said coil is a helical coil.

* * * * *